United States Patent
Lyons et al.

(10) Patent No.: US 6,830,615 B2
(45) Date of Patent: Dec. 14, 2004

(54) HIGH SURFACE AREA INCINERATION PRODUCT

(75) Inventors: Anthony V. Lyons, Macon, GA (US); David Skuse, Sandersville, GA (US); Stacey Johnson, Cochran, GA (US); Jonathan Phipps, Lower Cambourne (GB)

(73) Assignee: Imerys Pigments, Inc., Roswell, GA (US)

( * ) Notice: Subject to any disclaimer, the term of this patent is extended or adjusted under 35 U.S.C. 154(b) by 2 days.

(21) Appl. No.: 10/289,329

(22) Filed: Nov. 7, 2002

(65) Prior Publication Data

US 2003/0121452 A1 Jul. 3, 2003

Related U.S. Application Data

(60) Provisional application No. 60/331,176, filed on Nov. 9, 2001.

(51) Int. Cl.⁷ .................................................. C09C 1/02
(52) U.S. Cl. ....................... 106/464; 106/412; 106/424; 106/463; 106/464; 162/4; 162/29
(58) Field of Search ................................ 106/412, 424, 106/463, 464; 162/4, 29

(56) References Cited

U.S. PATENT DOCUMENTS

| | | |
|---|---|---|
| 3,765,921 A | 10/1973 | Puskar |
| 3,920,800 A | 11/1975 | Harris |
| 4,479,920 A | 10/1984 | Dodson |
| 5,292,495 A | 3/1994 | Nakajima et al. |
| 5,332,474 A | 7/1994 | Maxham |
| 5,558,782 A | 9/1996 | Bleakley et al. |
| 5,683,590 A | 11/1997 | Phipps |
| 5,733,461 A | 3/1998 | Bleakley et al. |
| 5,750,086 A | 5/1998 | You |
| 5,846,378 A * | 12/1998 | Phipps ..................... 162/29 |
| 5,961,941 A | 10/1999 | Klyosov et al. |
| 6,004,467 A | 12/1999 | Bleakley |
| 6,063,237 A | 5/2000 | Adams et al. |
| 6,159,381 A | 12/2000 | Bleakley et al. |
| 6,425,973 B1 * | 7/2002 | Phipps ..................... 162/4 |

FOREIGN PATENT DOCUMENTS

| | | |
|---|---|---|
| DE | 196 18 529 | 11/1997 |
| EP | 0 568 488 | 11/1993 |
| EP | 0 798 268 | 10/1997 |
| GB | 2315743 | 2/1998 |
| WO | WO 96/06057 | 2/1996 |
| WO | WO 96/32354 | 10/1996 |
| WO | WO 97/28087 | 8/1997 |
| WO | WO 99/67335 | 12/1999 |

OTHER PUBLICATIONS

Co–Pending Application U.S. application No. 10/300,913, Filed: Nov. 21, 2002, Inventors: Phipps, Title: Treatment of Solid Containing Material Derived From Effluent.

* cited by examiner

*Primary Examiner*—C. Melissa Koslow
*Assistant Examiner*—Shalie Manlove
(74) *Attorney, Agent, or Firm*—Finnegan, Henderson, Farabow, Garrett & Dunner, L.L.P.

(57) ABSTRACT

The present invention relates to a high surface area product and its production from solid-containing material, such as waste effluent from a paper-treating plant. The high surface area product comprises calcium carbonate, and is useful as a coefficient of friction control filler for newsprint.

13 Claims, 1 Drawing Sheet

HIGH SURFACE AREA INCINERATION PRODUCT

DESCRIPTION OF THE INVENTION

This application claims priority to U.S. Provisional Patent Application No. 60/331,176, filed Nov. 9, 2001.

FIELD OF THE INVENTION

The present invention relates to a high surface area incineration product. The high surface area makes the product suitable as, for example, a coefficient of friction (COF) control filler for newsprint. When used as such a filler, the product provides improved newsprint runnability on, for example, a press. The product is prepared by a process that enables the recovery of a high surface area product comprising calcium carbonate from solid-containing material, such as effluent or waste from a plant for treating waste paper.

BACKGROUND OF THE INVENTION

The processing and disposal of solid containing material from a plant for treating waste paper, such as de-inking sludges, has been a persistent problem for the paper industry, as the cost of sludge disposal continues to increase. De-inking sludges are the product of several physical separation steps designed to achieve the maximum ink removal from waste paper to produce a pulp that is as bright and speck-free as possible. A typical de-inking operation converts only 85% of its wastepaper into pulp, and the remaining 15% forms the de-inking sludge. Most de-inking processes will reject at least half of the mineral content of the wastepaper, which constitutes 50% or more of the sludge.

One of the goals of processing de-inking sludge has been to recycle useful minerals contained therein, such as calcium. However, attempts to separate minerals from the sludge typically fail for several reasons. For example, during processing of the sludge the minerals will have already been rejected by a process that uses several physical characteristics to distinguish the components of the sludge from the accepted fibers. In the case of washing, the characteristic is size, and in the case of floatation, it is a combination of size and surface chemistry. Another reason why simple separations fail is the completeness of the separation required for an acceptable product. Sludges contain up to 1% carbon black from inks, and even a 90% removal of this contaminant will produce a pigment with a brightness of less than 60% ISO, which is not acceptable for use in paper.

Methods for treating solid-containing material contained in paper treatment waste are known and are disclosed in, for example, U.S. Pat. Nos. 5,683,590; 5,846,378; and 6,063,237, the disclosures of which are all incorporated by reference herein. The processes disclosed in these patents are generally not suitable for preparing the high surface area products according to the present invention for a number of reasons. By way of example, U.S. Pat. No. 5,846,378 teaches the use of low incineration temperatures, e.g., temperatures below 750° C. Such incineration temperatures are generally not suitable for preparing the high surface area products according to the invention.

The present inventors have discovered that a high surface area product can be obtained from solid-containing material, such as effluent from a waste paper treatment process, using a process that includes the steps of incineration, comminution, and carbonation.

The high surface area product of the present invention is useful in newsprint manufacture. High surface area affects the coefficient of friction in newsprint by adsorbing pitch material, which comprises fatty acids and triglycerides, from newsprint pulp furnish. This pitch material tends to bloom to the surface of newsprint and, acting as lubricant, causes a reduction in the coefficient of friction. This then causes slippage within a paper roll that will cause runnability problems on a newsprint press.

It is known to use calcined clay, silicas, talc, and chemical technology to increase COF in newsprint. However, certain disadvantages are attendant with these options. For example, talc and chemical technologies don't provide ink strike-through control and light scatter to newsprint. There exists a need to provide a high surface area product that provides a high coefficient of friction, ink strike-through control, and light scatter, all in one product.

According to one aspect of the invention, there is provided a high surface area product prepared from solid-containing material by a process comprising subjecting the solid-containing material to controlled incineration at a temperature ranging from 800 to 900° C., comminution, and carbonation, wherein the high surface area product comprises calcium carbonate.

According to another aspect of the invention, there is provided a high surface area product comprising calcium carbonate, wherein the high surface area product meets the following specifications:

| | |
|---|---|
| <2 micron PSD content: | 65–100% |
| <1 micron PSD content: | 30–70% |
| Surface area: | >35 $M^2/g$ |
| GE brightness: | >75 |
| Einlehner abrasion: | <40 mg at 10K rev. |

According to yet another aspect of the invention, there is provided a method for preparing a high surface area product, said method comprising subjecting a solid-containing material to controlled incineration at a temperature ranging from 800 to 900° C., comminution, and carbonation.

According to still another aspect of the invention, there is provided a method for improving newsprint runnability, said method comprising incorporating into the newsprint a high surface area product prepared from solid-containing material by a process comprising subjecting the solid-containing material to controlled incineration at a temperature ranging from 800 to 900° C., comminution, and carbonation, and wherein the high surface area product comprises calcium carbonate.

According to still another aspect of the invention, there is provided a method for improving the coefficient of friction in newsprint, said method comprising incorporating into the newsprint a high surface area product obtained from solid-containing material by a process comprising subjecting the solid-containing material to controlled incineration at a temperature ranging from 800 to 900° C., comminution, and carbonation.

Figure 1:
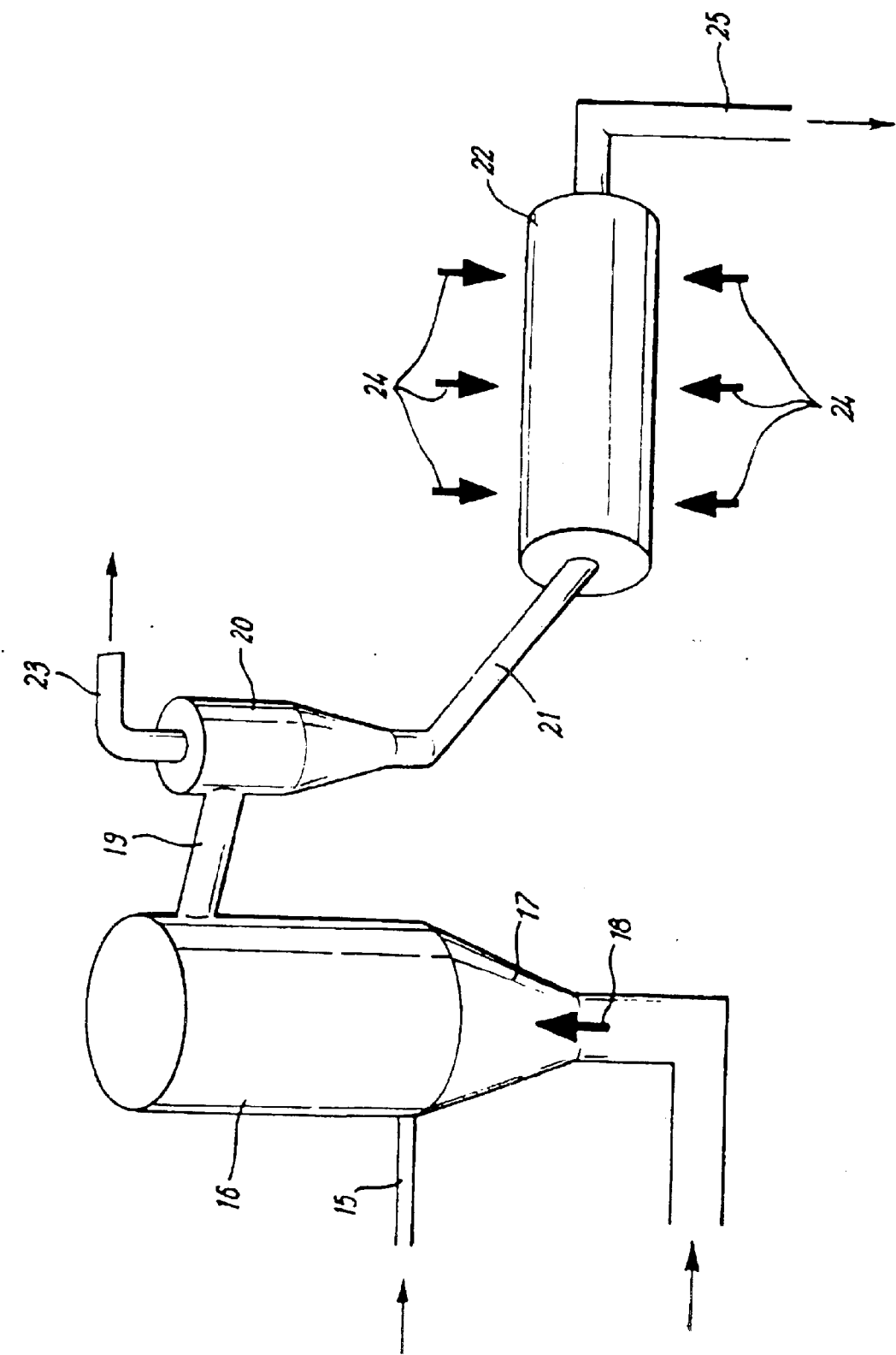
FIG. 1 is a diagrammatic sketch showing an arrangement of an apparatus that can be used to prepare the high surface area products of the present invention.

Unless otherwise indicated, all numbers expressing quantities of ingredients, process conditions such as temperature, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. All numeric ranges are to be understood as containing the endpoints of the range, as modified by the term "about". At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

In accordance with the invention, a high surface area product is provided from solid-containing material, such as material obtained from a paper treating plant. High surface area is defined as a surface area sufficient to adsorb fatty acid and triglyceride pitch from newsprint, thereby reducing the coefficient of friction of newsprint. According to one aspect of the invention, a high surface area means a surface area of at least 35 $M^2/g$. According to another aspect of the invention, a high surface area means a surface area of at least 50 $M^2/g$.

According to one embodiment of the invention, the high surface area product is provided that has the following specifications:

| | |
|---|---|
| <2 micron PSD content: | 65–100% |
| <1 micron PSD content: | 30–70% |
| surface area: | >35 $M^2/g$ |
| GE brightness: | >75 |
| Einlehner abrasion: | <40 mg at 100K rev.. |

The solid-containing starting material used for preparing the high surface area product of the present invention may be material derived from an aqueous effluent from a process for making or treating paper or paper waste. The organic material present in the solid material may comprise any ingredients typically found in kaolinic or carbonaceous processing streams, including one or more of fibrous materials, such as cellulose, ink, adhesive material, e.g., starch or latex, and chemicals, e.g., water soluble polymers, employed as additives such as dispersants, flocculants, retention aids, etc., in paper making.

The treated solid-containing material may also include carbonaceous material, e.g., carbon particles derived from printing ink. Such carbonaceous material may comprise calcium carbonate and/or kaolin. According to one aspect of the invention, a high surface area product may be prepared from a feed having a $CaCO_3$ content ranging from 25 to 60% by weight relative to the total weight of the feed. The high surface area product of the present invention is prepared by a method that oxidizes the carbon present without causing excessive heating of the inorganic particulate material present. Such carbonaceous material may be sufficiently oxidized in a single heat treatment stage, or may be oxidized in one stage of a multi-stage process after controlled combustion of the organic content as described hereinafter.

The inorganic material present in the solid material may, in addition to calcium carbonate, comprise kaolin, metakaolin, other carbonates such as dolomite, calcium sulfate, mica, talc, titanium dioxide and other white particulate material used in paper and other pigment or filler containing materials. The high surface area product of the present invention may be obtained from wastes containing, as inorganic particulate material, a mixture comprising at least calcium carbonate and kaolin and/or metakaolin, since these materials normally form abrasive products when heated together in the methods of the prior art.

The high surface area product of the present invention may be obtained from any kaolinic or carbonaceous material, such as material contained in or produced from effluent from a plant for the de-inking of waste paper. Such material may contain a substantial quantity of calcium carbonate, kaolin, and/or metakaolin. By "a substantial quantity" is meant at least 5 and up to 95% by weight relative to the total weight of the inorganic content of the solid material in the material treated.

Material obtained as waste from a paper de-inking plant contains substantial quantities of organic matter that is readily combustible. In preparing the high surface area product according to the present invention, it is desirable not to allow the heat generated by combustion of the organic matter to raise the temperature substantially above a temperature at which the abrasion levels of the product are too high. According to one embodiment of the invention, this may be a temperature of 900° C. This is achieved either by (1) using a process in which the conditions of operation are chosen so that the temperature will not be too high; (2) by monitoring the temperature of the process and adjusting the conditions of the process to reduce the heat produced if the temperature exceeds a safe level; or (3) a combination of the foregoing.

Where the solids in the starting material include carbonaceous material, e.g., carbon, present in an amount of at least 0.01 percent by weight, e.g., at least 0.5 percent by weight based on the dry weight of solids present, the heat treatment process in the method may comprise a single heat treatment stage or a process having two or more heat treatment stages, herein called a "multi-stage" process.

In the first stage of a multi-stage process, organic compounds are burned in a manner such that measures are taken to prevent localized temperatures from exceeding the temperature necessary to provide a product with acceptable abrasion. According to one aspect of the invention, that temperature is 900° C. This may be done by, for example, controlling the delivery rate and temperature of air introduced to burn the organic compounds. In the second stage of the multi-stage process, after the organic compounds present have been burned (or at least a sufficient amount has been burned to substantially eliminate their heat generating capacity), any residual carbonaceous material from the first stage is burned. This has the effect of removing residual black coloration from the material treated. In a following stage, the avoidance of temperature increases arising locally from heat of combustion is not required. The material formed after the multi-stage heat treatment may be a white powder or particulate material.

The starting material for obtaining the high surface area product of the present invention may be obtained by de-watering an aqueous suspension, obtained as an effluent from a plant for treating effluent from a paper making or coating plant, or from a plant for treating waste paper, such as a plant for de-inking paper waste, so that the dry weight of solid material present in the suspension is at least 20% by weight of the material to be treated. The material to be treated could have a solids content at any level above this concentration, but since the de-watering required to achieve high solids concentrations is time consuming and costly, solids concentrations having a dry weight of solid material in the range of from 20% to 60% by weight, or even 40 to 60% by weight, are suitable.

The de-watering may be carried out by one or more known processes, for example by evaporation, filtration, pressing, or centrifuging. The solid material remaining after dewatering may comprise shredded and/or pressed pellets or lumps of moist material.

The heat treatment process used in preparing the high surface area product according to the invention may be carried out in one of several different ways, for example, using one or more suitable vessels, e.g., a furnace and/or a kiln. A fluid flow heating furnace in which the solid-containing material is suspended in a heating fluid flow is suitable for preparing the high surface area products according to the invention. Where the process comprises a multi-stage process, the different stages may be carried out in the same vessel or in different vessels. Where the same vessel is used in one or more stages, the material treated may be subject to multiple passes through the vessel by a suitable recycling procedure.

One example of a method which may be used for carrying out the first stage of the two stage heat treatment process is as follows.

Moist solid material, e.g., lumps or pellets of shredded and/or pressed material, is burned in a fluid flow furnace at a temperature which is controlled to be maintained at a temperature that achieves the desired product. According to one embodiment of the invention, this may be a temperature within the range of from 800° C. to 1000° C., or according to another aspect of the invention 800° C. to 900° C., or according to yet another aspect of the invention 850° C. to 900° C., in which case the organic components of the solid material are substantially completely burned to harmless compounds, leaving the mineral components of the solid material mixed with a small quantity of carbonaceous material. The temperature in the furnace may be controlled during the burning process by suitable adjustment of the air flow rate applied.

The method for carrying out the first stage may suitably be carried out in any art-recognized furnace. According to one aspect of the invention, the furnace may be a furnace of the toroidal fluid flow kind. In this type of furnace, a toroidal fluid flow heating zone is established, and particles to be calcined are injected into the heating zone. Furnaces of the toroidal fluid flow kind are known and are described in, for example, U.S. Pat. No. 4,479,920, the disclosure of which is incorporated by reference herein. Generally, a hot gas, such as air, is passed through gaps between angled blades or vanes in a ring of blades or vanes provided in the operational chamber of the furnace. The blade ring is formed in an annular gap between the wall of the chamber and a central block, e.g., an upwardly pointing conical portion, located on the axis of the chamber. Gas flow is caused to follow a rotary path in a doughnut shaped region around the block and in individual swirls within the rotary path. This ensures efficient heat transfer to material, e.g., particulate material, to be heated in the gas flow.

The second stage of the multi-stage heat treatment process may conveniently be carried out using a rotary kiln. The temperature in this stage will ideally be kept below 850° C. The temperature maintained in the heat treatment process or in the first stage of a multi-stage heat treatment process for preparing a high surface area product may be selected so that the decomposition of organic components proceeds at an acceptable rate and the desired amount of calcium oxide is produced.

The material treated by any of the foregoing processes may, following the heat treatment process, be allowed to cool. As noted above, the cooled product will generally comprise a powder or particulate material comprising calcium carbonate. The cooled product may also contain clay, for example kaolin clay, as well as metakaolin, calcium sulfate, talc, mica, titanium dioxide and other mineral or inorganic particulate materials. Some of the materials present, such as clays, may have been converted to a calcined form by the heat treatment process. The material obtained as a product is desirably white and free of dark particles, such as carbon.

After the calcined product has been re-suspended in an aqueous medium, and possibly prior to the precipitation step, it may be treated by comminution, e.g., by grinding, in a manner well known to those skilled in the art.

Such a comminution step, which may be carried out as described hereinafter, is desirable when the product includes a substantial quantity of basic material, such as calcium oxide, or material formed by reaction with calcium oxide. The comminution step will reduce the abrasiveness of the product and will assist exposure of basic materials, such as calcium oxide and calcium hydroxide, to water and carbon dioxide to facilitate subsequent precipitation. The comminution also increases the light scattering coefficient, and thus the brightness, of the particulate product to be produced. Furthermore, the comminution ensures that a substantially uniform particle size distribution is achieved, thereby making the product quality less affected by particle size variations in the minerals present in the original sludge.

More anionic species, such as carbonate produced by carbon dioxide, may be required to reach the desired pH. Furthermore, without the comminution unreacted basic material, such as calcium oxide, not contacted by water and carbon dioxide during the re-suspension and precipitation steps, will cause the product pH to rise during storage. Furthermore, the calcium oxide will be bound up in aggregates with clay, and is not easily accessed by water or carbon dioxide. Comminution, as noted above, assists such access.

When comminution is performed by sandgrinding, the grinding energy suitable for the purposes of the invention may range from 50 to 250 kWh per ton at 25% solids. According to another aspect of the invention, the grinding energy ranges from 50 to 100 kWh per ton at 25% solids.

The material prepared according to the invention has an Einlehner abrasion value of not more than 50 mg at 100K revolutions. In another embodiment, the Einlehner abrasion value is less than 40 mg at 100K revolutions. In yet another embodiment, the Einlehner abrasion value is less than 30 mg at 100K revolutions. Such abrasiveness values are quite low for inorganic particulate materials recovered from, for example, de-inking plant wastes using incineration processes. For example, if solids obtained from an effluent sludge from a de-inking plant are incinerated in a conventional way, e.g., by incineration with no temperature control, the Einlehner abrasion value of the ash product obtained after incineration is typically greater than 300 mg.

After comminution, the product is subjected to a precipitation step. This may be accomplished by transferring the product to a precipitated calcium carbonate (PCC) reactor, where a carbon dioxide gas is bubbled through to convert any calcium oxide produced in the incineration into calcium carbonate.

The carbon dioxide-containing gas may be substantially pure carbon dioxide. Alternatively, the carbon dioxide-containing gas may be present as a mixture of gases, such as flue or exhaust gases from a lime kiln or power plant, or carbon dioxide mixed with air or nitrogen. The suspension of finely ground inorganic material to which the carbon dioxide is applied may be at ambient temperature but, when calcium hydroxide is present in the suspension, the production of calcium carbonate in the scalenohedral form may be favored by maintaining the temperature of the suspension in the range from 20 to 65° C. Without being bound by a specific theory or mechanism, it is believed that the scalenohedral form is suitable for the purposes of the invention because it provides for a product having an increased surface area. According to one aspect of the invention, the carbonation temperature may range from 20 to 35° C. The quantity of the carbon dioxide containing gas passed through the suspension is suitably such as to reduce the pH of the suspension to 7.

For products in which the incineration temperature was over 800° C., there is evidence at high scanning electron microscope magnification of very fine pores. Without being bound by a particular theory or mechanism, it is believed that the pores probably result from rapid loss of carbon dioxide from the carbonate particles (in the sludge, in this case). Further evidence of this is seen in BET surface area data, where products according to the invention made at higher temperatures can have surface areas of 50 $M^2/g$.

Thus, it is believed that the incineration temperatures used in preparing the products of the present invention facilitate the production of calcium oxide. The carbonation step allows for the rapid loss of carbon dioxide from the calcium oxide particles. The rapid loss of carbon dioxide results in a porous product with a high surface area, which is especially suitable as a coefficient of friction control filler.

One suitable process for preparing the inventive product is demonstrated by the following example.

As shown in FIG. 1, de-watered sludge from a plant for de-inking waste paper is fed at a dry solids concentration of 50% by weight through a duct 15 into a fluidized bed furnace 16, to which fluidizing air is supplied through a conduit 17. The temperature in the fluidized bed is maintained in a selected range, e.g., 800 to 900° C., initially by heating the fluidizing air by burner means 18. Thereafter, the chemical decomposition of the organic components of the sludge may generate sufficient heat to maintain the required temperature, or heat may be supplied to the fluidizing air as required, the rates of supply of sludge and fluidizing air being controlled to keep the temperature at the desired level. The gases and entrained mineral components of the sludge are discharged from the fluidized bed through a conduit 19 to a cyclone separator 20. The mineral components, together with a small quantity of carbonaceous material, are separated from the gases and are discharged from the base of the cyclone through a conduit 21 to a rotary kiln 22. The gases separated by the cyclone separator 20 are discharged through a conduit 23 to means for recovering thermal energy for re-use. The efficiency of the combustion of the organic components in the fluidized bed at a temperature in the range of from 800 to 900° C. is found to be such that these gases are substantially free of any harmful compounds. The temperature in the rotary kiln 22 is maintained in the same range as that of the fluidized bed in the furnace 16 by controlling heating means 24. The heat treated mineral components, substantially free of carbonaceous materials are finally discharged through a conduit 25.

The product formed after heat treatment using the apparatus of FIG. 1 is cooled and then subjected to grinding and precipitation processes as described above.

Because the PCC reactor product is sandground and carbonated at relatively low solids, a dewatering step may be necessary before use, e.g., before incorporation into a paper filler composition.

EXAMPLES

Example 1

Analysis of Feed Material and the Products Produced Therefrom

Waste paper effluent, or rejects, from two different industrial paper-treating plants were obtained. These two rejects were separately analyzed for solids content, the loss of organic material following combustion at 500° C., and the amount of remaining $CaCO_3$, and clay. The results are provided below in Table 1:

TABLE 1

| Analysis (%) | Plant A Rejects | Plant B Rejects |
| --- | --- | --- |
| Solids | 58 | 49 |
| Loss at 500° C. (e.g., organics content) | 41 | 51 |
| % $CaCO_3$ | 31 | 21 |
| Remainder (clay) | 28 | 28 |

The plant A and plant B rejects were separately processed, by the methods discussed above, in order to prepare two high surface area products according to the invention. The product from each plant is referred to as product A and product B. The physical characteristics of these products were analyzed and are provided in Table 2.

TABLE 2

| Analysis | Product A | Product B |
| --- | --- | --- |
| Brightness | 77.2 | 80.6 |
| Yellowness | 8.4 | 7.3 |
| L* | 93.3 | 94.4 |
| a* | 1.25 | 0.9 |
| b* | 5.19 | 4.45 |
| PSD Sedigraph | | |
| % <5 µm | 97.2 | 97.9 |
| % <2 µm | 81.0 | 81.2 |
| % <1 µm | 57.6 | 56.0 |
| % <0.5 µm | 25.8 | 25.7 |
| % <0.25 µm | 7.9 | 8.2 |
| Abrasion (mg/mm$^2$) | 108 | 106 |
| % $CaCO_3$ | 57 | 50 |
| Surface Area ($M^2/g$) | 49.6 | 38.4 |

Example 2

Analysis of Coefficient of Friction

As discussed above, the fatty acid pitch in newsprint pulp furnish tends to bloom to the surface of newsprint and cause a reduction in the coefficient of friction. This causes slippage within a paper roll, which in turn causes runnability problems on a newsprint press. A high surface area product according to the invention was incorporated into newsprint and was evaluated for its use as coefficient of friction control filler. The coefficient of friction properties imparted by the inventive product were compared with the coefficient of friction properties of four known pigments.

In order to test the effectiveness of the high surface area product according to the invention, newsprint that is known to have high levels of pitch was selected. Accordingly, furnish was obtained from Augusta Newsprint, comprised of 70% thermomechanical pulp and 30% recycled newsprint. A 48 GSM handsheet was prepared using a TAPPI sheet mold.

1 lb./ton Nalco™ 954 polymer was used to coagulate the furnish so that it is retained in the sheet.

The pigments were used as filler addition at 0, 3%, and 6% by weight, relative to the total weight of the furnish.

The coefficient of friction was tested using three separate samples with three consecutive slides per sample set. The coefficient of friction of the slides was identified as follows:

S1—slide one static
S2—slide two static
S3—slide three static
K1—slide one kinetic
K2—slide two kinetic
K3—slide three kinetic The product according to the present invention was analyzed and compared with pigments of the prior art. Their physical properties of the product according to the invention and the pigments of the prior art are provided below in Table 3.

TABLE 3

|  | Invention | Alphatex | Opacitex | Hydrex "P" | Huberfil "B" |
|---|---|---|---|---|---|
| Brightness | 77.2 | 92.3 | 80.6 | 97 | 93.77 |
| L | 93.3 | 97.26 | 93.73 | 98.07 | 97.96 |
| a | 1.25 | −0.09 | 0.25 | 0.13 | 0.01 |
| b | 5.19 | 2.06 | 5.87 | 0.32 | 1.92 |
|  |  | PSD |  |  |  |
| % <10 | — | 100 | 99 | 99 | 99.8 |
| % <5 | 97.2 | 99 | 95 | 97 | 96.3 |
| % <2 | 81 | 97 | 84 | 77 | 74.3 |
| % <1 | 57.6 | 89 | 73 | 57 | 50.4 |
| % <0.5 | 25.8 | 57 | 49 | 36 | 30.8 |
| % <0.25 | 7.9 | 17 | 11 | 20 | 15.8 |
| D30 | — | 0.334 | 0.372 | — | 0.485 |
| D50 | 0.89 | 0.451 | 0.506 | — | 0.988 |
| D70 | — | 0.608 | 0.865 | — | 1.775 |
| Abrasion | 108[1] | 14.9[2] | 6[2] | 14.9[2] | 2.3[2] |
| Surface Area | 49.6 | 17.4 | 25.6 | 55.3 | 62.6 |
| Oil Absorption | 89.2 | 70.9 | 79.6 | 144 | 122.9 |

[1](Breunig) mg/mm$^2$
[2]Einlehner mg loss at 100K rev.

The coefficient of friction was tested using the standard TAPPI method, which is well known to those of skill in the art. The results are provided below for a 3% Virgin filler in Table 4, and a 6% Virgin filler in Table 5.

TABLE 4

| 3% Virgin Filler | Brt[1] | Opc[1] | S Scat[3] | P Scat[4] | B Factor[5] | Bulk | Pors[6] | T Index[7] | S1 | K1 | S2 | K2 | S3 | K3 |
|---|---|---|---|---|---|---|---|---|---|---|---|---|---|---|
| Unfilled | 58.5 | 88.6 | 548 | — | 14.8 | 2.81 | 21.3 | 29.7 | 0.368 | 0.325 | 0.357 | 0.309 | 0.370 | 0.319 |
| Alphatex | 61.4 | 88.9 | 625 | 3350 | 12.6 | 2.85 | 16.6 | 25.1 | 0.463 | 0.389 | 0.490 | 0.394 | 0.494 | 0.415 |
| Huberfil "B" | 61.1 | 88.1 | 614 | 2856 | 12.5 | 2.91 | 13.7 | 25.8 | 0.547 | 0.533 | 0.573 | 0.522 | 0.584 | 0.531 |
| Hydrex "P" | 61.8 | 89.2 | 655 | 4111 | 12.3 | 2.86 | 18.0 | 24.8 | 0.564 | 0.547 | 0.583 | 0.567 | 0.606 | 0.557 |
| Invention | 58.0 | 88.9 | 594 | 1508 | 16.3 | 2.96 | 20.6 | 27.4 | 0.59 | 0.527 | 0.532 | 0.501 | 0.512 | 0.484 |
| Opacitex | 60.6 | 88.4 | 619 | 2998 | 12.8 | 2.81 | 17.1 | 25.2 | 0.438 | 0.378 | 0.435 | 0.364 | 0.444 | 0.374 |

[1]Brightness, measured using a Technidyne Micro TB1C Brightness, Opacity, and Color tester.
[2]Opacity, measured using a Brightmeter Micro S-5.
[3]Sheet Scatter (TAPPI Test Method T 1214 sp-98).
[4]Pigment Scatter (TAPPI Test Method T 425 om96)
[5]Burst Factor (TAPPI Method T 403 om-97)
[6]Porosity, measured using a Gurley High Pressure Densometer
[7]Tear Index, measured using an Elmendorf tearing resistance tester.

TABLE 5

| 6% Virgin Filler | Bright | Opac | S Scatter | P. Scat | B. Factor | Bulk | Pors | T Index | S1 | K1 | S2 | K2 | S3 | K3 |
|---|---|---|---|---|---|---|---|---|---|---|---|---|---|---|
| Unfilled | 58.5 | 86.6 | 548 | — | 14.8 | 2.81 | 21.3 | 29.7 | 0.368 | 0.325 | 0.357 | 0.309 | 0.370 | 0.319 |
| Alphatex | 63.1 | 89.8 | 697 | 3350 | 11.3 | 2.81 | 16.8 | 23.4 | 0.544 | 0.483 | 0.540 | 0.481 | 0.548 | 0.496 |
| Huberfil "B" | 63.3 | 89.1 | 671 | 2856 | 11.8 | 2.94 | 12.2 | 24.1 | 0.743 | 0.676 | 0.745 | 0.659 | 0.754 | 0.683 |
| Hydrex "P" | 63.6 | 90.0 | 712 | 4111 | 11.4 | 2.90 | 16.4 | 23.5 | 0.670 | 0.620 | 0.671 | 0.616 | 0.688 | 0.621 |
| Invention | 59.2 | 91.0 | 692 | 1508 | 14.8 | 2.91 | 19.3 | 25.0 | 0.547 | 0.63 | 0.648 | 0.606 | 0.647 | 0.612 |
| Opacitex | 62.3 | 89.8 | 681 | 2998 | 11.6 | 2.82 | 17.1 | 23.7 | 0.505 | 0.455 | 0.493 | 0.440 | 0.527 | 0.452 |

The results show that the effectiveness of the high surface area product according to the present invention as a coefficient of friction control filler is at least comparable to the pigments of the prior art. Thus, a product prepared from, e.g., waste materials is at least as effective as, if not more effective than, known pigments.

Two methods for predicting the effectiveness of the inventive products as coefficient of friction control fillers were investigated. In the first method, the surface area of the inventive product was calculated by the amount of oil the product absorbed. It was expected that the linear relationship between oil absorption and surface area would be predictive of coefficient of friction control. However, it was found that the more direct method of measuring surface area, using the BET method well-known to those of ordinary skill in the art, was a better indicator of surface area and thus, a better way of predicting coefficient of friction control.

The accompanying drawing, which is incorporated in and constitutes a part of this specification, illustrates one embodiment of the invention, and together with the description, serves to explain certain principles of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claim.

What is claimed is:

1. A high surface area product comprising a solid-containing material comprising calcium carbonate, said solid-containing material having a surface area of greater than 35 $M^2/g$ and a particle size distribution (PSD) such that 65 to 100% of the particle are less than 2 micron.

2. A high surface area product according to claim 1, wherein the surface area is at least 50 $M^2/g$.

3. A high surface area product according to claim 1, wherein the solid-containing material is contained in or produced from an effluent or waste from a process for treating waste paper.

4. A high surface area product according to claim 1, wherein the calcium carbonate is present in the solid-containing material in an amount ranging from 25 to 60% by weight, relative to the total weight of the solid-containing material.

5. A high surface area product according to claim 1, wherein the high surface area product meets the following specifications:

| <1 micron PSD content: | 30–70% |
|---|---|
| GE brightness: | >75 |
| Einlehner abrasion: | <30 mg. |

6. A high surface area product according to claim 5, wherein the surface area is at least 50 $M^2/g$.

7. A method for preparing a high surface area product, said method comprising:

(A) subjecting a solid-containing material to controlled incineration at a temperature ranging from 800 to 900° C.

(B) comminution; and (C) carbonation, wherein the high surface area product comprises calcium carbonate.

8. A method for preparing a high surface area product according to claim 7, wherein the incineration is performed in a toroidal fluid flow furnace.

9. A method for preparing a high surface area product according to claim 8, wherein the incineration is performed in a single stage.

10. A method for preparing a high surface area product according to claim 8, wherein the incineration is performed in two stages.

11. A method for preparing a high surface area product according to claim 7, wherein the incineration temperature ranges from 850 to 900° C.

12. A method for preparing a high surface area product according to claim 7, wherein the comminution is performed by grinding an wherein the grinding energy ranges from 50 to 100 kWh per ton at 25% solids.

13. A method for preparing a high surface area product according to claim 7, wherein the carbonation is performed at a temperature ranging from 20 to 35° C.

* * * * *